(12) United States Patent
Mastrangelo et al.

(10) Patent No.: US 9,210,237 B2
(45) Date of Patent: Dec. 8, 2015

(54) CACHED DATA DETECTION

(71) Applicant: Microsoft Technology Licensing, LLC, Redmond, WA (US)

(72) Inventors: Michael P. Mastrangelo, Seattle, WA (US); Aladdin A. Nassar, Santa Clara, CA (US); David M. Alongi, Redmond, WA (US); Emmanuel Jose Miranda-Steiner, Redmond, WA (US); Tze Meng Lee, San Carlos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/617,354

(22) Filed: Feb. 9, 2015

(65) Prior Publication Data

US 2015/0180996 A1      Jun. 25, 2015

Related U.S. Application Data

(63) Continuation of application No. 13/081,222, filed on Apr. 6, 2011, now Pat. No. 8,966,059.

(51) Int. Cl.
*G06F 15/173* (2006.01)
*H04L 29/08* (2006.01)
*G06F 11/34* (2006.01)

(52) U.S. Cl.
CPC ........ *H04L 67/2842* (2013.01); *G06F 11/3419* (2013.01); *G06F 11/3466* (2013.01); *H04L 67/10* (2013.01); *G06F 11/3476* (2013.01); *G06F 2201/865* (2013.01); *G06F 2201/875* (2013.01); *G06F 2201/885* (2013.01)

(58) Field of Classification Search
CPC . H04L 67/2842; H04L 67/10; G06F 11/3476; G06F 11/3419; G06F 11/3466; G06F 2201/865; G06F 2201/875; G06F 2201/885
USPC .......................................................... 709/224
See application file for complete search history.

(56) References Cited

U.S. PATENT DOCUMENTS 6,078,956 A      6/2000  Bryant et al.
7,600,008 B1 *  10/2009  Greene .......................... 709/223
(Continued)

OTHER PUBLICATIONS

"Final Office Action", U.S. Appl. No. 13/081,222, Feb. 27, 2014, 29 pages.
(Continued)

*Primary Examiner* — Faruk Hamza
*Assistant Examiner* — Shah R Zaman
(74) *Attorney, Agent, or Firm* — Tom Wong; Jim Ross; Micky Minhas

(57) ABSTRACT

A service assigns session identifiers to usage sessions of a program on a computing device, and maintains records in a log of received page requests and associated session identifiers, as well as received cached data detection requests and associated session identifiers. This log can be used to determine how many usage sessions existed over a particular amount of time, and how many of the usage sessions used data from a local cache rather than from the service. The service also returns, in response to a received cached data detection request, a response including an indication that the response is from the service. The program can determine that the response was received from the service if the indication is included in the response, and that the response was received from a local cache of the computing device if the indication is not included in the response.

20 Claims, 5 Drawing Sheets

(56) References Cited

U.S. PATENT DOCUMENTS

| | | | |
|---|---|---|---|
| 7,634,562 | B2 | 12/2009 | Litofsky et al. |
| 7,676,574 | B2 | 3/2010 | Glommen et al. |
| 7,765,295 | B2 | 7/2010 | Anastas |
| 7,970,816 | B2 * | 6/2011 | Chess et al. ............ 709/203 |
| 8,966,059 | B2 | 2/2015 | Mastrangelo et al. |
| 2003/0120752 | A1 | 6/2003 | Corcoran |
| 2006/0059125 | A1 * | 3/2006 | Yan .................... 707/3 |
| 2009/0150534 | A1 * | 6/2009 | Miller et al. ............ 709/223 |
| 2010/0161717 | A1 * | 6/2010 | Albrecht et al. ............ 709/203 |
| 2010/0257230 | A1 * | 10/2010 | Kroeger et al. ............ 709/203 |
| 2010/0262646 | A1 | 10/2010 | Lee et al. |
| 2010/0274890 | A1 * | 10/2010 | Patel et al. ............ 709/224 |
| 2010/0293335 | A1 | 11/2010 | Muthiah et al. |
| 2011/0078318 | A1 * | 3/2011 | Desai et al. ............ 709/228 |
| 2012/0254417 | A1 * | 10/2012 | Luna ............ 709/224 |
| 2012/0259969 | A1 | 10/2012 | Mastrangelo |
| 2014/0019524 | A1 | 1/2014 | Schlusser et al. |

OTHER PUBLICATIONS

"Non-Final Office Action", U.S. Appl. No. 13/081,222, Jun. 5, 2014, 32 pages.

"Non-Final Office Action", U.S. Appl. No. 13/081,222, Jul. 31, 2013, 23 pages.

"Notice of Allowance", U.S. Appl. No. 13/081,222, Oct. 16, 2014, 17 pages.

"Random file, Zip and PDF tracking using jQuery & Google analytics", Retrieved from: <http://www.diaryofaninja.com/blog/2009/09/17/random-file-zip-and-pdf-tracking-using-jquery-amp-google-analytics> on Jan. 25, 2011, Sep. 17, 2009, 3 pages.

Smith, "BrowserHawk 10.0 Sophisticated Browser Detection and Logging", Retrieved from: <http://www.windowsitpro.com/article/aspnetpro/browserhawk-10-0.aspx> on Jan. 24, 2011, Apr. 23, 2007, 4 pages.

* cited by examiner

CACHED DATA DETECTION

RELATED APPLICATIONS

This application is a continuation of U.S. patent application Ser. No. 13/081,222, filed Apr. 6, 2011, entitled "Cached Data Detection", the entire disclosure of which is hereby incorporated by reference herein in its entirety.

BACKGROUND

Computers oftentimes access services over a network such as the Internet. Information used by computers in displaying data when accessing such services can be obtained from the service over the network, or alternatively can be retrieved from a local cache of the computer (e.g., where the information was saved from a previous time when the service was accessed). Although it may be desirable to know whether the information is typically obtained by computers from the service or from the local caches, it can be difficult for computers and services to know how frequently the information is obtained from the local caches of the computers and how frequently the information is obtained from the service.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a service requests for one or more pages from the service are received from programs running on computing devices. For each request, information regarding the request and a session identifier associated with a usage session of the program from which the request is received are stored. Additionally, the service receives from one or more of the programs both a cached data detection request and the session identifier associated with the usage session of the program from which the cached data detection request is received. For each cached data detection request, information regarding the cached data detection request and the session identifier are stored.

In accordance with one or more aspects, a program on a computing devices receives, from a remote service in response to a page request, a page and a session identifier associated with a usage session of the program. A cached data detection request targeting the remote service is also sent, and a response to the cached data detection request is received. Based on an indication received with the response, a determination is made as to whether the cached data detection response is provided by the remote service or by a local cache of the computing device. Additionally, a determination is made that data for the remote service is in the local cache if the cached data detection response is provided by the local cache, and that data for the remote service is not in the local cache if the cached data detection response is provided by the remote service.

BRIEF DESCRIPTION OF THE DRAWINGS

The same numbers are used throughout the drawings to reference like features.

DETAILED DESCRIPTION

Cached data detection is discussed herein. When a program such as a Web browser on a device accesses a remote service, the program sends a page request to the remote service. The remote service assigns a session identifier to the current usage session of the program, and returns both the requested page and the session identifier to the program. The program then sends a cached data detection request to the service requesting particular data, and includes the session identifier with the cached data detection request. The service can readily track whether devices already have the particular data cached (and thus whether other data from the remote service is likely cached at the devices) based on the number of session identifiers that are assigned and the number of cached data detection requests that are received. By comparing the ratio between these two requests on the service side, an estimate can be determined of the percent of user sessions that have their content in the cache of the program (if programs always had the particular data cached then no cached data detection requests would be received by the remote service). Additionally, the program can readily track whether the device already had the particular data cached (and thus whether other data from the remote service is likely cached at the device).

Figure 1:
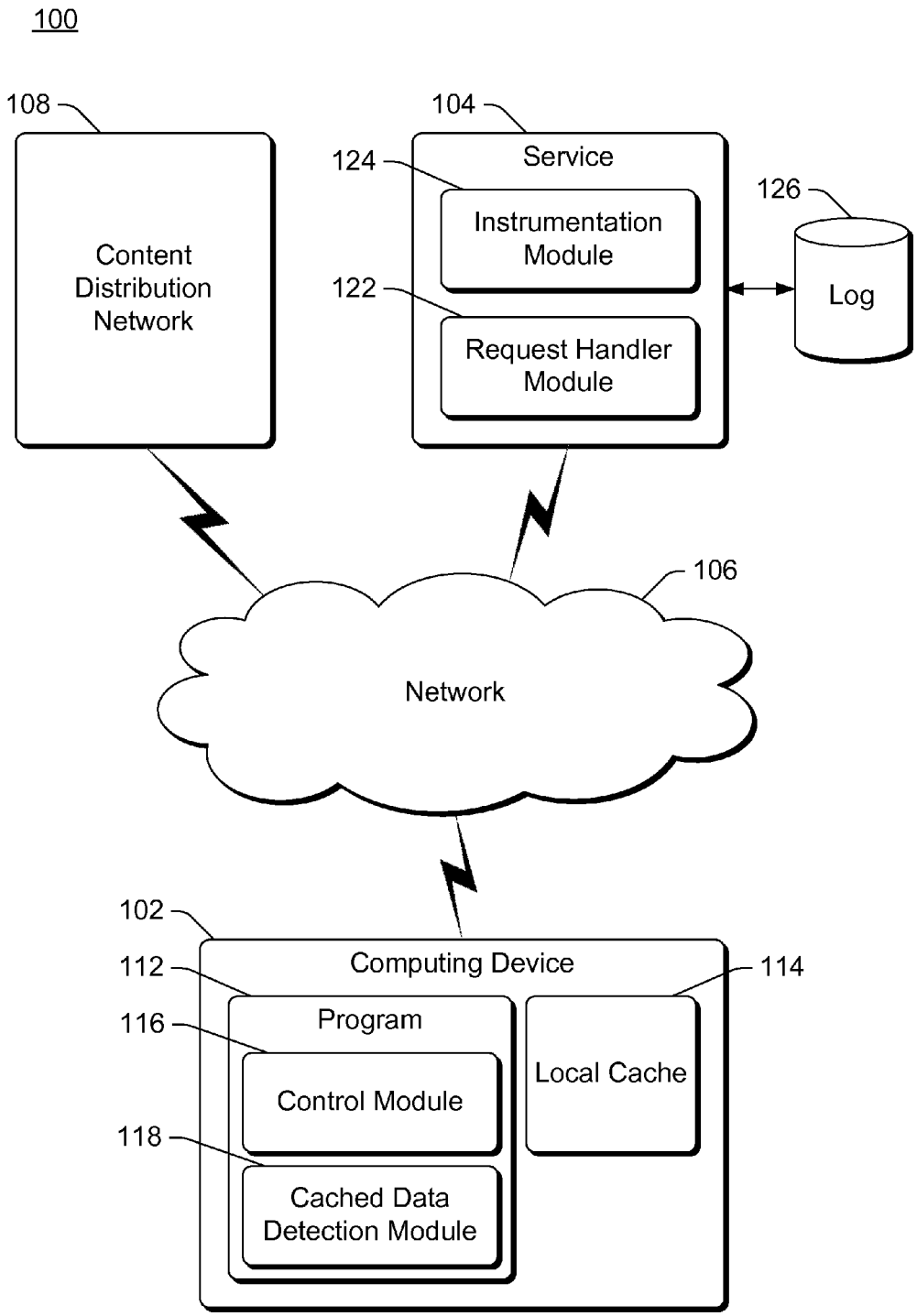
FIG. 1 illustrates an example system implementing the cached data detection in accordance with one or more embodiments.

FIG. 1 illustrates an example system 100 implementing the cached data detection in accordance with one or more embodiments. System 100 includes a computing device 102 that can communicate, via a network 106, with a service 104 and content distribution network 108. Network 106 can be a variety of different types of networks, including the Internet, a local area network (LAN), a cellular or other phone network, an intranet, other public and/or proprietary networks, combinations thereof, and so forth.

Computing device 102 can be a variety of different types of devices, such as a physical device or a virtual device. For example, computing device 102 can be a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Computing device 102 can also be a virtual device, such as a virtual machine running on a physical device. A virtual machine can be run on any of a variety of different types of physical devices (e.g., any of the various types listed above).

Service 104 can be implemented by one or more of a variety of different types of devices, analogous to computing device 102. Service 104 can provide a variety of different types of services to computing device 102, such as entertainment services (e.g., games, audio and/or video content, etc.), productivity services (e.g., word processing functionality, spreadsheet functionality, etc.), utility services (e.g., data storage functionality, email functionality), social networking services, combinations thereof, and so forth. Service 104 is also referred to as a remote service due to service 104 begin accessed by computing device 102 via network 106, and typically not being located in close physical proximity to computing device 102 (e.g., accessed by computing device 102 via the Internet). Similarly, device 102 is referred to as a remote device relative to service 104. Although a single computing device 102 and service 104 are illustrated in system 100, it should be noted that system 100 can include any number of computing devices 102 communicating with any number of services 104.

System 100 also optionally includes a content distribution network 108, which is a collection of one or more computing devices that make data available to computing device 102 and/or service 104. Content distribution network 108 can be implemented by one or more of a variety of different types of devices, analogous to computing device 102. Service 104 can indicate to computing device 102 which data to obtain, if any, from content distribution network 108.

Computing device 102 includes a program 112 and a local cache 114. Local cache 114 is referred to as being local due to its being included as part of computing device 102.

Program 112 includes a control module 116 and cached data detection module 118. Although illustrated as two modules 116 and 118, it should be noted that the functionality of one or both of modules 116 and 118 can be separated into multiple modules, and/or that functionality of modules 116 and 118 can be combined into a single module. Control module 116 performs the functionality of program 112 including generating a user interface for presentation to a user of computing device 102, responding to received user inputs, retrieving data from service 104 and/or content distribution network 108 for presentation (or execution) by computing device 102, and so forth. Cached data detection module 118 determines whether data for service 104 is provided to program 112 from service 104 or from local cache 114, as discussed in more detail below. The operation of control module 116 can vary based on the determination made by cached data detection module 118, as discussed in more detail below.

Service 104 includes a request handler module 122 and an instrumentation module 124. Although illustrated as two modules 122 and 124, it should be noted that the functionality of one or both of modules 122 and 124 can be separated into multiple modules, and/or that functionality of modules 122 and 124 can be combined into a single module. Request handler module 122 receives requests for data from program 112, and provides the requested data to program 112 for presentation or execution by computing device 102. These requests for data can be requests for particular pages (e.g., including data to be displayed and/or scripts), files, portions of files, and so forth. The particular data requested can vary based on the manner in which service 104 is implemented and the type of services provided by service 104. Instrumentation module 124 monitors requests received from computing device 102 and stores information regarding those requests in log 126, as discussed in more detail below.

In one or more embodiments, program 112 is a Web browser. The Web browser sends requests for Web pages to service 104, and request handler module 122 returns the requested Web pages to the Web browser. The Web browser can also send requests for Web pages to content distribution network 108, which returns the requested Web pages to the Web browser. These requested Web pages can include data to be displayed or otherwise presented by computing device 102, as well as instructions or scripts for execution by or in program 112 to determine data to be displayed or otherwise presented by computing device 102. The Web browser can also send requests for particular files or particular data within a file to service 104 (which returns the requested file or data to the Web browser) and/or to content distribution network 108 (which returns the requested file or data to the Web browser).

Program 112 has associated usage sessions. In one or more embodiments a usage session begins when program 112 begins running, and ends when program 112 stops running. Each running of program 112 is thus a different usage session. In other embodiments, usage sessions can begin and end at different times, such as ending after a threshold amount of time of inactivity of program 112 is detected (e.g., no user inputs for program 112 are received for a threshold amount of time), ending a particular amount of time (e.g., one hour) after the usage session began, beginning when a previous usage session ends, and so forth.

Session identifiers are assigned to each usage session. In one or more embodiments, a module of service 104 (such as instrumentation module 124) assigns the session identifiers to the usage sessions, although alternatively other modules or components can assign the session identifiers to the usage sessions. The session identifier is assigned in response to a request for data from service 104, and is returned to program 112 as part of the response to the request (e.g., in a cookie included as part of the response). Program 112 maintains the session identifier for use during the usage session. Subsequent requests for data that program 112 submits to service 104 during the usage session include the session identifier assigned to that usage session. Instrumentation module 124 can determine when to assign a session identifier to a usage session in different manners, such as when particular data is initially requested by program 112 during a usage session (e.g., a starting Web page or home Web page of service 104 is requested, a log-in or authentication Web page of service 104 is requested, and so forth), when a request is received that does not include a session identifier, and so forth.

A session identifier can be an alphanumeric or other value allowing different sessions to be distinguished from one another by service 104. For example, a session identifier can be a Globally Unique Identifier (GUID). Different usage sessions have different session identifiers, allowing information regarding different usage sessions to be tracked. However, it should be noted that no information identifying the particular computing device 102, or identifying the user of computing device 102, need be (and typically is not) recorded.

Instrumentation module 124 monitors requests received from computing device 102 and stores a record of information regarding those requests in log 126. Various different information can be included in this record, and in one or more embodiments the information included in this record includes both a session identifier and an indication of the data being requested. The session identifier is the session identifier associated with the usage session of the program 112 (e.g., assigned to or included as part of a request received from program 112). The data being requested is, for example, a particular Web page, a particular file, a portion of a particular file, and so forth.

Figure 2:
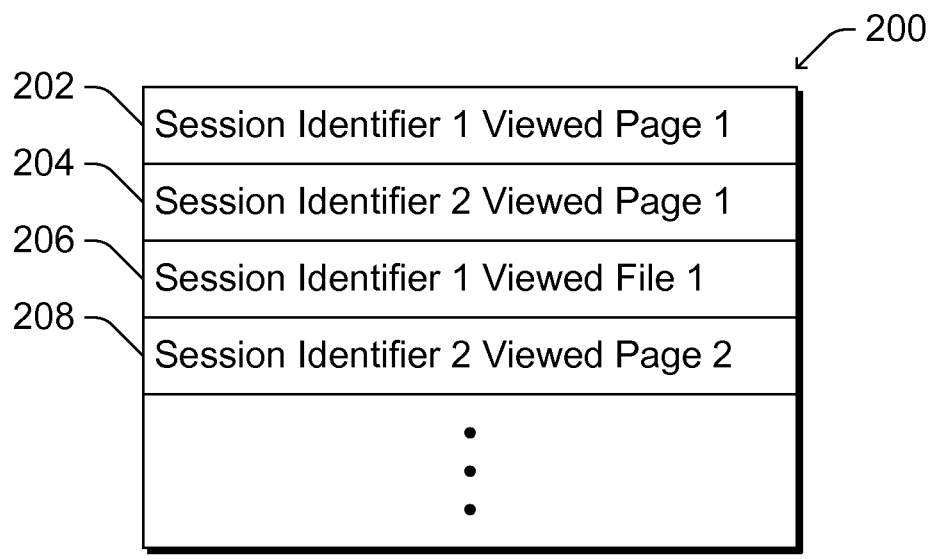
FIG. 2 illustrates example records in a log in accordance with one or more embodiments.

FIG. 2 illustrates example records in a log 200 in accordance with one or more embodiments. Log 200 can be, for example, a log 126 of FIG. 1. In the illustrated example of FIG. 2, four records 202, 204, 206, and 208 are illustrated. It should be noted that these records 202, 204, 206, and 208 are examples, and that the records can be stored in any of a variety of formats.

Record 202 indicates that for a usage session having "session identifier 1", a page of the service identified as "page 1" was requested and returned to a program on a computing device (e.g., a device 102 of FIG. 1). Record 204 indicates that for a usage session having "session identifier 2", the page of the service identified as "page 1" was requested and returned to a program on a computing device (which could be the same or a different computing device as the program with the usage session having "session identifier 1"). Record 206 indicates that for the usage session having "session identifier 1", a file of the service identified as "file 1" was requested and returned to the program on the computing device. This "file 1" can be the file requested as the cached data detection request. Record 208 indicates that for the usage session having "session identifier 2", a page of the service identified as "page 2" was requested and returned to the program on the computing device. Numerous additional records for the same or different usage sessions, as well as the same or different pages or files (or other data) can also be maintained in log 200.

Returning to FIG. 1, at some point after program 112 begins running, program 112 sends an initial request for data to service 104. This initial request sent (for each usage session of program 112) is also typically a page request, which refers to a request for data (e.g., a Web page) that is to be displayed or otherwise presented by computing device 102. As different page requests are sent by program 112, each response to a page request is a page of data that typically replaces (although alternatively can be presented concurrently with) the previously displayed page. This initial request can be a page request for a starting Web page or home Web page of service 104, a request for a log-in or authentication Web page of service 104, and so forth. This page that is initially requested is a non-cacheable page, so the page is not stored in local cache 114. Thus, each time this initial request is sent, the request is responded to by service 104 (and a session identifier can be assigned as discussed above).

After program 112 sends an initial request for data to service 104 and receives the response, cached data detection module 118 sends a cached data detection request targeting service 104. Cached data detection module 118 can determine a time to send the cached data detection request targeting service 104 in a variety of different manners. In one or more embodiments, module 118 sends the cached data detection request a threshold amount of time (e.g., 5 seconds) after a "window.onload" event occurs indicating that the Web page requested in the initial request has finished loading at computing device 102. The cached data detection request is typically sent only once per usage session, such as after the first Web page (or another particular Web page known to program 112) is received from service 104. In other embodiments, module 118 sends the cached data detection request at other times, such as a threshold amount of time after a response with a session identifier is received from service 104, a threshold amount of time after program 112 begins running, and so forth.

The cached data detection request is a request for a particular file or for data from a particular file. In one or more embodiments, in response to a request for a page (e.g., a Web page) from program 112, service 104 returns both the requested page and a session identifier assigned to the current usage session. The returned page includes an image tag having an associated identifier (e.g., a uniform resource locator (URL)) of a file stored by service 104 that includes the image data. Alternatively, the identifier of the file can be determined in other manners, such as being programmed into (or otherwise known or obtained by) program 112, being included in a cookie received from service 104 along with the session identifier, and so forth. Cached data detection module 118 identifies the identifier of the file, and sends a request (which is the cached data detection request) for the identified file, the request targeting service 104. The identified file is typically a small file (e.g., zero bytes or one byte) because the identified file is used for the cached data detection discussed herein rather than for display of an image to a user of computing device 102. Alternatively, the identified file can include data that is displayed or otherwise used by computing device 102. In one or more embodiments, all requests for the identified file are treated by service 104 as cached data detection requests.

The cached data detection request targeting service 104 refers to the cached data detection request including an identifier of service 104 indicating service 104 is the intended recipient of the request. However, the cached data detection request may not actually be communicated to service 104. Computing device 102 maintains copies of data that was returned to computing device by service 104 and content distribution network 108 in response to previous requests sent by program 112 (and/or other programs on computing device 102) in local cache 114. When a request for data (e.g., a particular file or portion of a file) is sent by program 112 targeting service 104, computing device 102 checks local cache 114 to determine whether a valid (e.g., non-expired) copy of the requested data is present in local cache 114. If a valid copy of the requested data is present in local cache 114, then the request is responded to by local cache 114 rather than being sent to service 104. Thus, if the data requested in the cached data detection request is included in local cache 114, the data is returned to program 112 from local cache 114 rather than from service 104.

The identified file that is returned in response to the cached data detection request has a cache retention policy (e.g., an expiration date or time to live) that is the same as (or similar to) the cache retention policy used by other data returned from service 104 and content distribution network 108. By using the same cache retention policy for the files of service 104 and the identified file returned in response to the cached data detection request, cached data detection module 118 can expect that if the identified file returned in response to the cached data detection request is in local cache 114, then other files of service 104 are also included in local cache 114.

When service 104 receives a cached data detection request, request handler module 122 responds to the request by returning the requested file to program 112. In addition, request handler module 122 includes an indication that the response is provided by service 104. In one or more embodiments, this indication is a cookie that is returned along with the requested file. The cookie can include some data indicating that the cookie was received from service 104 (or alternatively simply from some remote device or service), or alternatively can include no data. Alternatively, this indication that the response is provided by service 104 can take other forms, as long as the indication is not cached in local cache 114 but the response is cached in local cache 114.

In one or more embodiments, local cache 114 does not cache cookies. Thus, although the file received from service 104 in response to the cached data detection request is stored in local cache 114, the cookie received from service 104 is not stored in local cache 114. Alternatively, in other embodiments both the file received from service 104 and the cookie are stored in local cache 114. In such embodiments, service 104 assigns a short time to live or expiration time for the cookie (e.g., one second or five seconds). The cookie becomes invalid after the time to live or expiration time has passed, and the cookie is deleted if cached (or alternatively is simply ignored if cached). In other implementations, although cookies may be stored in local cache 114, those cookies are not returned along with files and/or other data from local cache 114 in response to requests from program 112.

Cached data detection module 118 determines whether data for service 104 is provided to program 112 from service 104 or from local cache 114 based on the presence of the cookie (or other indication that the response is provided by service 104). If, in response to the cached data detection request, both the requested file and the cookie (or other indication) are returned, then cached data detection module 118 determines that the requested file was not in local cache 114, and was returned from service 104 rather than local cache 114. Because data received in response to requests is cached in local cache 114, cached data detection module 118 assumes that if the file requested in the cached data detection request is not stored in local cache 114 then other data for service 104 (e.g., from service 104 or content distribution network 108) is also not stored in local cache 114. Thus, cached data detection module 118 detects that data for service 104 for the current usage session is not cached in local cache 114.

However, if in response to the cached data detection request the requested file (but not the cookie or other indication) is returned, then cached data detection module 118 determines that the requested file was in local cache 114, and was returned from local cache 114 rather than service 104. Because data received in response to requests is cached in local cache 114, cached data detection module 118 assumes that if the file requested in the cached data detection request is stored in local cache 114 then other data for service 104 (e.g., from service 104 or content distribution network 108) is also stored in local cache 114. Thus, cached data detection module 118 detects that data for service 104 for the current usage session is cached in local cache 114.

Furthermore, instrumentation module 124 records in log 126 information regarding requests received by computing device 102 as discussed above. Thus, log 126 includes a record of each request received from program 112 having a particular session identifier, including requests for pages as well as requests for particular files (e.g., the file requested as the cached data detection request). The records in log 126 can thus be analyzed (e.g., by service 104 or another device or service) to identify how many different session identifiers were assigned as well as how many cached data detection requests were received. If a cached data detection request for a particular usage session was responded to by local cache 114 then that particular cached data detection request was not sent to service 104 and thus no record of the cached data detection request having the session identifier for that usage session is included in log 126.

Because data received in response to requests is cached in local cache 114, it is assumed that if the cached data detection request was not received by service 104, then the file requested in the cached data detection request (as well as other data for service 104 whether from service 104 or content distribution network 108) is also stored in local cache 114. Furthermore, it is assumed that if the cached data detection request was received by service 104, then the file requested in the cached data detection request (as well as other data for service 104 whether from service 104 or content distribution network 108) is not stored in local cache 114. Thus, an indication of how many usage sessions existed over a particular amount of time, as well as how many of those usage sessions used data from a local cache rather than requesting the data from service 104 and/or content distribution network 108, can be readily determined based on the records stored in log 126.

Log 126 maintains a record regarding requests received by service 104, such as both the session identifier and an indication of the data being requested, as discussed above. Different services 104 can maintain different logs 126 (and/or different records within log 126 can be associated with particular services 104), allowing the records to be analyzed for different services 104. The different services 104 can be specified or defined in different manners based on the desires of the designer or administrator of service 104. In one or more embodiments, the different services 104 are defined so that functionality using many (e.g., at least a threshold number) of the same files are grouped together as part of the same service 104. For example, a particular company or other entity may provide or otherwise make available various functionality, such as email functionality, data storage functionality, word processing functionality, photo management functionality, and so forth. Each of these various functionalities can be a different service 104, with records being maintained and/or analyzed separately for each of these. Alternatively, multiple ones of these various functionalities (e.g., data storage functionality and photo management functionality) can be part of the same service 104.

In one or more embodiments, various functionality can be grouped together as part of the same service 104 using the cached data detection requests. For functionality that is grouped together, the same identified file (e.g., having the same URL) is used by the web pages for that functionality. For example, if both data storage functionality and photo management functionality are part of the same service, then regardless of whether program 112 requests a Web page for the data storage functionality or a Web page for the photo management functionality, the same identified file (having the same URL) is used as the cached data detection request.

It should also be noted that a cached data detection request can be used at other levels of granularity other than functionality, such as for each Web page provided by service 104 (or for particular Web pages of interest to a developer or administrator of service 104). For each such Web page, the cached data detection request targeting service 104 is sent by program 112, allowing instrumentation module 124 to maintain records regarding whether a cached data detection request was received by service 104 for each such Web page of a usage session.

The data and instructions for service 104 are maintained in different files of service 104 and/or content distribution network 108, and these files can change over time as desired by the developer or administrator of service 104 in order to change the functionality of service 104. Different version numbers for service 104 can be maintained, and similarly cached data detection requests can include version numbers. The cached data detection requests can include version numbers in different manners, such as by using different URLs for different versions, including a query string that identifies the version number at the end of a URL, and so forth. When the files of service 104 and/or network 108 are updated, the version number of the cached data detection request is also updated. The version number can be included as part of the information that is recorded in log 126 for requests, allowing records to be maintained of different versions of the files for service 104 that are obtained from service 104 (or network 108) rather than from local cache 114.

In one or more embodiment, files and data returned by service 104 and/or content distribution network 108 can be marked as cacheable public or cacheable private. A file or data being marked cacheable public indicates that the file or data can be stored in local cache 114 as well as one or more other proxy servers that are coupled to or part of network 106. Such files or data cached in a proxy server can be returned to program 112 as if they were returned by service 104 (including any cookie as discussed above). A file or data being marked cacheable private, however, indicates that the file or data can be stored in local cache 114 but not in other proxy servers. The cached data detection request is marked as cacheable private, so that if a response to the cached data detection request is not returned by local cache 114 the cached data detection request is responded to by service 104 (and a record of the cached data detection request is maintained in log 126) rather than a proxy server or other intermediary.

In addition, the cached data detection request can be leveraged to determine a latency and/or bandwidth between computing device 102 and service 104. The latency between computing device 102 and service 104 refers to an amount of time taken for responses to requests to be received by computing device 102. A time when the cached data detection request is sent by program 112 to service 104 and a time when the response to the cached data detection request is received by program 112 from service 104 (which is known because the response includes the cookie as discussed above) can be identified, and a difference between those two times can be calculated. This difference is determined by program 112 to be the round trip time, and this difference can be divided by two in order to determine a latency (an amount of time taken for data to be downloaded to computing device 102 from service 104). Program 112 can also assume that this latency between computing device 102 and service 104 is the same as the latency between computing device 102 and content distribution network 108.

As discussed above, after program 112 sends a page request for data to service 104 and receives the response, cached data detection module 118 sends a cached data detection request targeting service 104. In one or more embodiments, the file or data that is requested by the cached data detection request is stored on the same device of service 104 as the data that was returned in response to the page request. Thus, a communication channel established between computing device 102 and that device of service 104 (e.g., using any of a variety of conventional or proprietary handshake or communication protocols) for the page request is also used for the cached data detection request. This use of the same communication channel improves the accuracy of the latency determination because the latency determination excludes time taken to establish the communication channel.

The bandwidth between computing device 102 and service 104 refers to a rate at which data can be communicated between computing device 102 and service 104. The bandwidth can be determined based on a time taken to download an additional large file. This additional file being large refers to the file being at least a threshold size (e.g., at least 50-100 kilobytes), and this additional file can include image content, audio content, other instructions or data, and so forth. This additional file is typically a file that is normally downloaded by computing device 102 from service 104 or content distribution network 108. Separate additional files can be downloaded from each of service 104 and content distribution network 108 to determine bandwidth between each of device 102 and service 104, and device 102 and content distribution network 108, respectively. Alternatively, the additional file can be downloaded from one of service 104 and content distribution network 108, and the bandwidth determined being the bandwidth for both service 104 and content distribution network 108.

To determine the bandwidth, the time taken to download the additional file is determined. This time taken to download the additional file is the difference between the time when the request for the additional file is sent by device 102 and the time when the additional file has been received by device 102. The bandwidth is then calculated as follows:

$$bandwidth = \frac{size}{dt - rtt}$$

where "bandwidth" is the bandwidth being calculated, "size" is the size of the additional file being downloaded, "dt" is the download time for the additional file request (the time taken to download the additional file), and "rtt" is the round trip time for the cached data detection request.

Cached data detection module 118 detects whether data for service 104 for the current usage session is cached in local cache 114 as discussed above, and program 112 can use the result of this detection, and optionally the determined latency and/or bandwidth, in a variety of different manners. A variety of different rules or criteria can be used by program 112 to determine how to alter the behavior of program 112 (e.g., control module 116) in obtaining files from service 104 and/or content distribution network 108 during a particular usage session based on the result of this detection, the determined latency, and/or the determined bandwidth. These rules or criteria can be programmed as part of, or otherwise obtained by, program 112. The behavior of program 112 can be altered in different manners, such as altering the rate at which files are requested from service 104 and/or content distribution network 108, altering whether files are requested from service 104 and/or content distribution network 108 in parallel or serially, and so forth.

For example, a rule can indicate that if data for service 104 is detected as being in local cache 114, then additional files are requested one-by-one because program 112 expects them to be returned quickly from local cache 114. By way of another example, a rule can indicate that if data for service 104 is detected as not being in local cache 114, then additional files can be requested in groups (e.g., a compressed file including multiple ones of the additional files) because program 112 expects them to be returned over network 106 which will be slower than if they are returned from local cache 114. By way of yet another example, a rule can indicate that if the bandwidth and/or latency are below a threshold amount, then program 112 is to display a button or other option allowing the user to request that smaller files (e.g., lower-resolution images or scripts with less functionality) be retrieved by program 112, which would be expected to be retrieved more quickly by program 112 than larger files.

Log 126 can be used to determine an indication of how many usage sessions existed over a particular amount of time, as well as how many of those usage sessions used data from a local cache rather than requesting the data from service 104 and/or content distribution network 108, as discussed above. These determinations can be used to alter the behavior and/or implementation of service 104, such as by service 104 itself or by a developer or administrator of service 104. This alteration of service 104 is typically implemented so as to tailor the behavior of service 104 to provide improved performance or user experience for users of devices that have the data from service 104 and/or network 108 already cached (e.g., if at least a threshold number of usage sessions used data from a local cache rather than requesting it from service 104 or network 108), or to provide improved performance or user experience for users of devices that do not have the data from service 104 and/or network 108 already cached (e.g., if less than a threshold number of usage sessions used data from a local cache rather than requesting it from service 104 or network 108).

For example, service 104 can be altered so that fewer and/or smaller files are typically initially used by program 112 during a usage session, allowing additional time for program 112 to retrieve those files prior to using them. By way of another example, service 104 can make differently sized files available to program 112 (e.g., lower-resolution images or scripts with less functionality). By way of yet another example, additional data and/or instructions can be included in program 112 rather than as part of service 104 and/or content distribution network 108, thereby reducing the amount of data and/or instructions that are retrieved by program 112 from service 104 and/or network 108.

Figure 3:
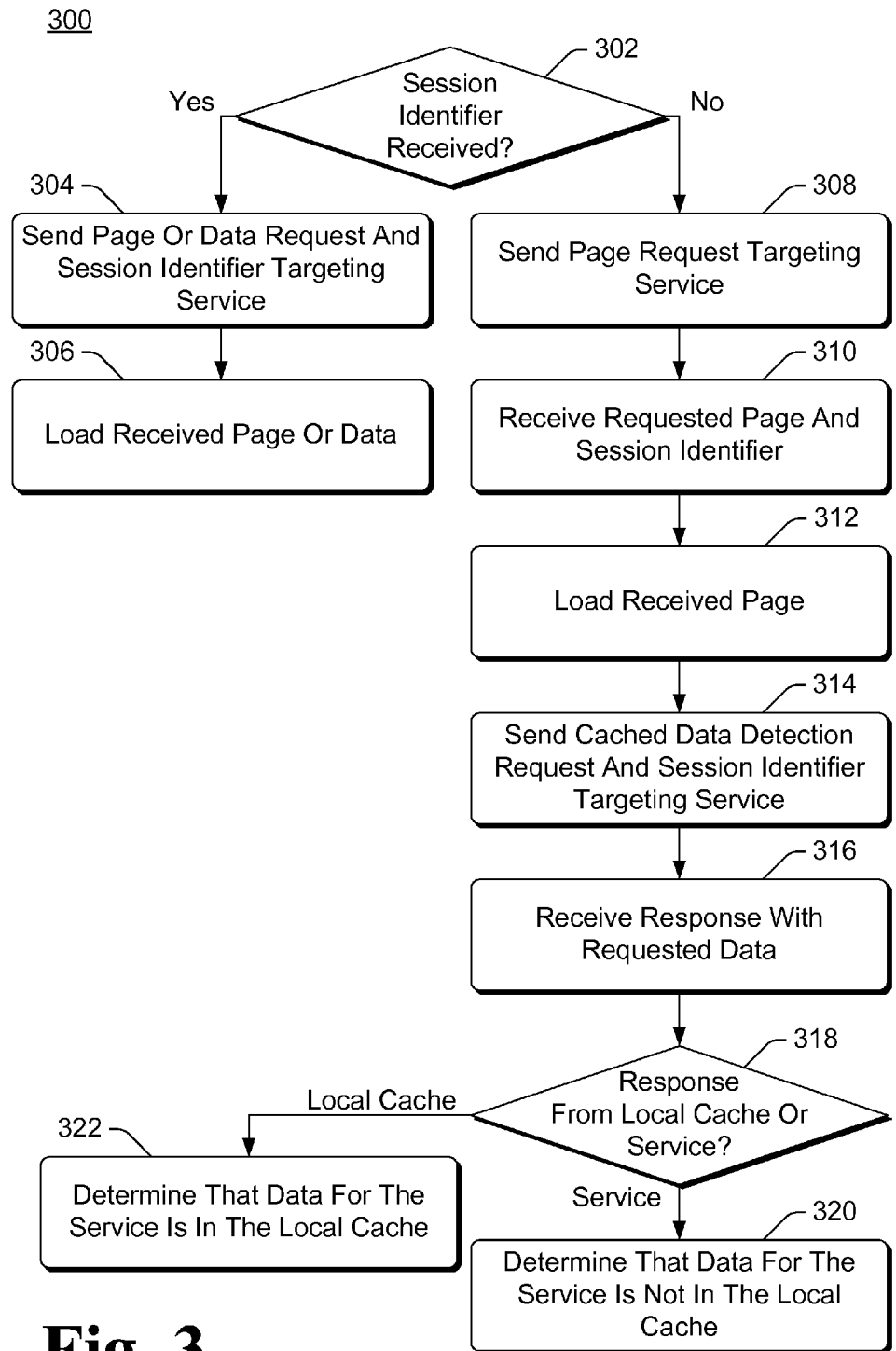
FIG. 3 is a flowchart illustrating an example process for a computing device implementing cached data detection in accordance with one or more embodiments.

FIG. 3 is a flowchart illustrating an example process 300 for a computing device implementing cached data detection in accordance with one or more embodiments. Process 300 is carried out by a program of a computing device, such as program 112 of FIG. 1, and can be implemented in software, firmware, hardware, or combinations thereof. Process 300 is shown as a set of acts and is not limited to the order shown for performing the operations of the various acts. Process 300 is an example process for implementing cached data detection; additional discussions of implementing cached data detection are included herein with reference to different figures.

In process 300, when the program desires a page from a service, a determination is made as to whether a session identifier for the current usage session has been received (act 302). The session identifier is received, for example, in response to an initial page request to a service as discussed above.

If a session identifier has been received, then a page or data request and the session identifier for the current usage session are sent targeting the service (act 304). Requests targeting the service can be responded to from the service or from a local cache as discussed above. The request can be for a particular page, particular file, particular data from a file, and so forth.

The requested page or data is received and loaded (act 306). Loading of the requested page or data refers to displaying or otherwise presenting the received page or data.

Returning to act 302, if the session identifier for the current usage session has not been received, then a page request targeting the service is sent (act 308). Requests targeting the service can be responded to from the service or from a local cache as discussed above. As the session identifier for the current usage session has not been received, the page request in act 308 is also the initial page request for the service as discussed above.

The requested page and a session identifier for the current usage session are received (act 310), and the requested page is loaded (act 312). The received session identifier is maintained for use during the current usage session.

A cached data detection request and the session identifier of the current usage session are also sent targeting the service (act 314), and a response to the cached data detection request with the requested data is received (act 316).

A determination is made as to whether the response received in act 316 was returned from a local cache or the service (act 318). This check can be made based on whether a cookie or other indication that the requested data is provided by the service is received with the response, as discussed above.

If the response was returned by the service, then the determination is made that the data for the service is not in the local cache (320). Thus, data for the service is expected to be returned by the service as discussed above.

However, if the response was returned by the local cache, then the determination is made that the data for the service is in the local cache (322). Thus, data for the service is expected to be returned by the local cache as discussed above.

Figure 4:
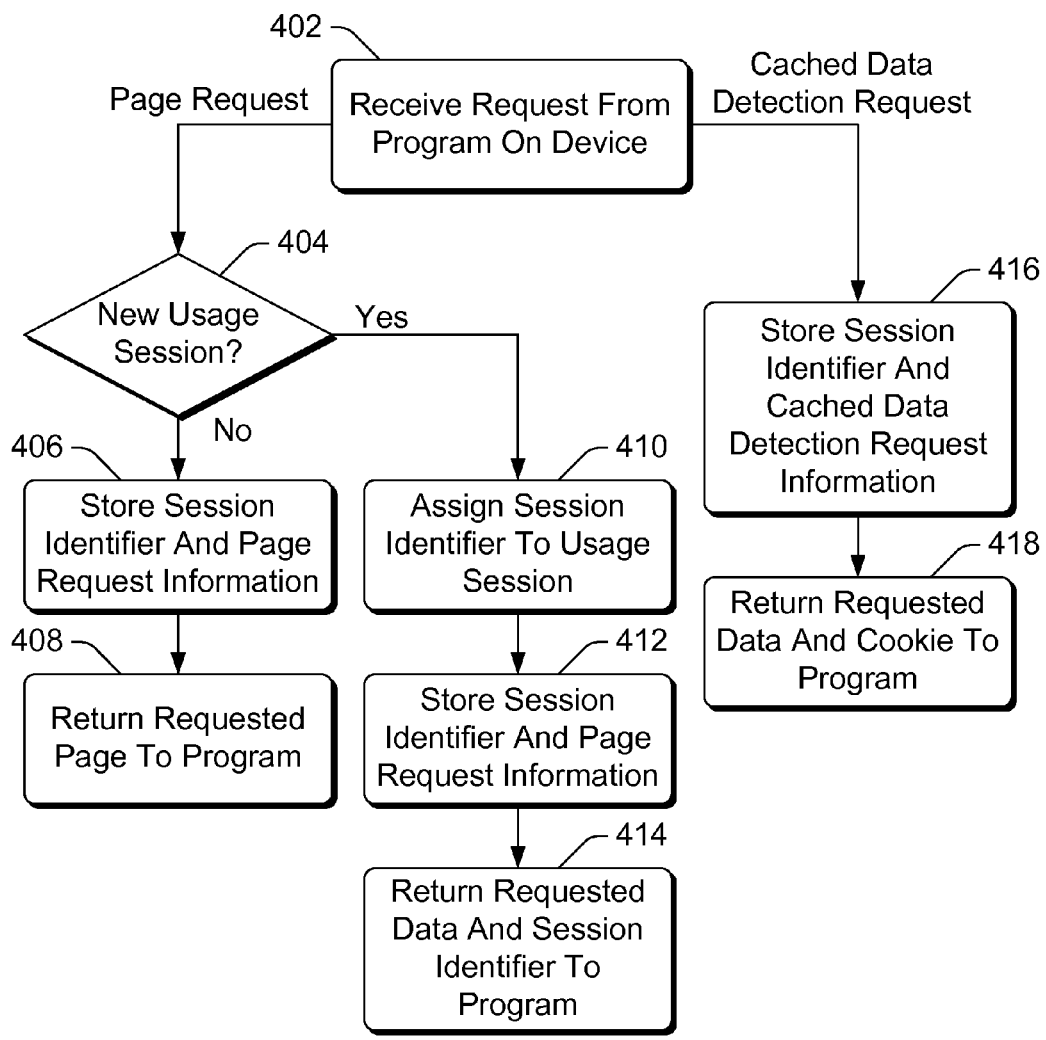
FIG. 4 is a flowchart illustrating an example process for a service implementing cached data detection in accordance with one or more embodiments.

FIG. 4 is a flowchart illustrating an example process 400 for a service implementing cached data detection in accordance with one or more embodiments. Process 400 is carried out by a service, such as service 104 of FIG. 1, and can be implemented in software, firmware, hardware, or combinations thereof. Process 400 is shown as a set of acts and is not limited to the order shown for performing the operations of the various acts. Process 400 is an example process for implementing cached data detection; additional discussions of implementing cached data detection are included herein with reference to different figures.

In process 400, a request is received from a program running on a device (act 402). Different types of requests can be received, including page requests and cached data detection requests. Although discussed with reference to page requests, requests for other data or files (other than cached data detection requests) are handled analogously to page requests.

If the received request is a page request, then a determination is made as to whether the page request is received as part of a new usage session (act 404). This determination can be made in different manners, such as based on whether a session identifier is included with the request. If the request includes a session identifier, then the request is not part of a new usage session; however, if the request does not include a session identifier, then the request is part of a new usage session.

If the request is not part of a new usage session, then the session identifier as received with the request in act 402 and information regarding the page request is stored in a log (act 406). Various information regarding the page request can be stored in the log as discussed above. The requested page is also returned to the program (act 408).

However, if the request is part of a new usage session, then a session identifier is assigned to the usage session (act 410). The session identifier can be assigned in different manners as discussed above.

Additionally, the session identifier assigned in act 410 and information regarding the page request is stored in the log (act 412). Various information regarding the page request can be stored in the log as discussed above. The requested page as well as the identifier assigned in act 410 are returned to the program (act 414).

Returning to act 402, if the request is a cached data detection request, then the session identifier as received with the request in act 402 and information regarding the cached data detection request is stored in the log (act 416). Various information regarding the cached data detection request can be stored in the log as discussed above. Additionally, the requested data as well as a cookie or other indicator that the response is being provided from the service are returned to the program (act 418).

Various actions such as communicating, receiving, sending, storing, generating, obtaining, and so forth performed by various modules are discussed herein. It should be noted that the various modules can cause such actions to be performed. A particular module causing an action to be performed includes that particular module itself performing the action, or alternatively that particular module invoking or otherwise accessing another component or module that performs the action (or performs the action in conjunction with that particular module).

Figure 5:
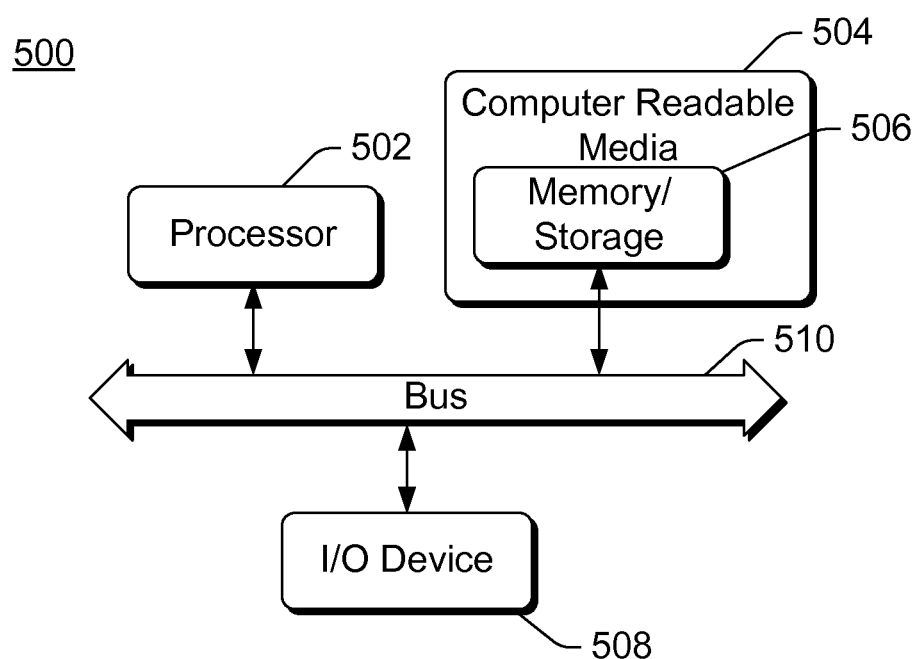
FIG. 5 illustrates an example computing device that can be configured to implement the cached data detection in accordance with one or more embodiments.

FIG. 5 illustrates an example computing device 500 that can be configured to implement the cached data detection in accordance with one or more embodiments. Computing device 500 can be, for example, computing device 102 of FIG. 1, a device implementing at least part of service 104 of FIG. 1, or a device implementing at least part of content distribution network 108 of FIG. 1.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the cached data detection techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
   one or more processors; and
   one or more computer readable media having stored thereon multiple instructions implementing a program that, when executed by the one or more processors, cause the one or more processors to:
   receive at the computing device, from a remote service in response to a page request, a page and a session identifier associated with a usage session of the program, the computing device being remote from the remote service;
   send a cached data detection request targeting the remote service, the cached data detection request being a request for particular data and causing the computing device to check a local cache on the computing device to determine whether the particular data is present in the local cache;
   receive a response to the cached data detection request;
   after receiving the response, determine at the computing device, based on whether a particular indication is received with the response, whether the cached data detection response is provided by the remote service or by the local cache of the computing device, the particular indication not stored in the local cache but the response cached in the local cache; and
   determine at the computing device that data for the remote service is in the local cache if the cached data detection response is provided by the local cache, otherwise determine at the computing device that data for the remote service is not in the local cache if the cached data detection response is provided by the remote service.

2. The computing device as recited in claim 1, the instructions that cause the one or more processors to send the cached data detection request including instructions that cause the one or more processors to send the session identifier with the cached data detection request.

3. The computing device as recited in claim 1, the particular indication comprising a cookie, and the instructions that cause the one or more processors to determine whether the cached data detection response is provided by the remote service or by the local cache including instructions that cause the one or more processors to determine that the response is from the remote service if the response includes the cookie, and otherwise to determine that the response is from the local cache.

4. The computing device as recited in claim 1, the instructions including instructions that further cause the one or more processors to alter a behavior of the program based on whether the cached data detection response is provided by the remote service or by the local cache of the computing device.

5. The computing device as recited in claim 1, the instructions including instructions that further cause the one or more processors to determine a latency between the computing device and the remote service, and to alter a behavior of the program based on the latency between the computing device and the remote service.

6. The computing device as recited in claim 1, the instructions including instructions that further cause the one or more processors to determine a bandwidth between the computing device and the remote service, and to alter a behavior of the program based on the bandwidth between the computing device and the remote service.

7. The computing device as recited in claim 1, the cached data detection request comprising a request for a particular file or data.

8. The computing device as recited in claim 7, the cached data detection request identifying the particular file or data by a uniform resource locator (URL).

9. The computing device as recited in claim 8, the URL including a version identifier that is updated each time one or more files of the remote service are updated.

10. The computing device as recited in claim 7, the particular file or data having a same cache retention policy as one or more other files provided to the program from the remote service.

11. The computing device as recited in claim 1, the program comprising a Web browser.

12. A method comprising:
receiving at a computing device, from a remote service in response to a page request, a page and a session identifier associated with a usage session of the program, the computing device being remote from the remote service;
sending a cached data detection request targeting the remote service, the cached data detection request being a request for particular data and causing the computing device to check a local cache on the computing device to determine whether the particular data is present in the local cache;
receiving a response to the cached data detection request;
after receiving the response, determining at the computing device, based on whether a particular indication is received with the response, whether the cached data detection response is provided by the remote service or by the local cache of the computing device, the particular indication not stored in the local cache, but the response cached in the local cache; and
determining at the computing device that data for the remote service is in the local cache if the cached data detection response is provided by the local cache, and otherwise determining at the computing device that data for the remote service is not in the local cache if the cached data detection response is provided by the remote service.

13. The method as recited in claim 12, the program comprising a Web browser, the particular indication comprising a cookie, and the determining whether the cached data detection response is provided by the remote service or by the local cache comprising determining that the response is from the remote service if the response includes the cookie, and otherwise determining that the response is from the local cache.

14. The method as recited in claim 12, the method further comprising altering a behavior of the program based on whether the cached data detection response is provided by the remote service or by the local cache of the computing device.

15. The method as recited in claim 12, the method further comprising determining a latency between the computing device and the remote service, and altering a behavior of the program based on the latency between the computing device and the remote service.

16. The method as recited in claim 12, the method further comprising determining a bandwidth between the computing device and the remote service, and altering a behavior of the program based on the bandwidth between the computing device and the remote service.

17. The method as recited in claim 12, the cached data detection request comprising a request for a particular file or data.

18. A computing device comprising:
at least one processor and a memory configured to store multiple instructions that are executable by the at least one processor;
a local cache;
a first subset of the multiple instructions configured to:
receive, at the computing device, from a remote service in response to a page request, a page and a session identifier associated with a usage session of a program of the computing device, the computing device being remote from the remote service,
send a cached data detection request targeting the remote service, the cached data detection request being a request for particular data and causing the computing device to check the local cache on the computing device to determine whether the particular data is present in the local cache, and,
receive a response to the cached data detection request;
a second subset of the multiple instructions configured to:
determine, at the computing device, based on whether a particular indication is received with the response, whether the cached data detection response received is provided by the remote service or by the local cache, the particular indication not being stored in the local cache regardless of whether the response received is cached in the local cache; and
a third subset of the multiple instructions configured to:
determine, at the computing device, that data for the remote service is in the local cache if the cached data detection response received is provided by the local cache, and otherwise determine that data for the remote service is not in the local cache if the cached data detection response received is provided by the remote service.

19. The computing device as recited in claim 18, the multiple subset of instructions being further configured to alter a behavior of the program based on whether the cached data detection response is provided by the remote service or by the local cache.

20. The computing device as recited in claim 18, the cached data detection request comprising a request for a particular file or data having a same cache retention policy as one or more other files provided to the computing device from the remote service.

* * * * *